(12) United States Patent
Yoneji (10) Patent No.: US 8,237,686 B2
(45) Date of Patent: Aug. 7, 2012

(54) MANIPULATOR

(75) Inventor: Osamu Yoneji, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 331 days.

(21) Appl. No.: 12/452,469

(22) PCT Filed: Jul. 30, 2008

(86) PCT No.: PCT/JP2008/063669
§ 371 (c)(1),
(2), (4) Date: Dec. 31, 2009

(87) PCT Pub. No.: WO2009/020026
PCT Pub. Date: Feb. 12, 2009

(65) Prior Publication Data
US 2010/0141610 A1 Jun. 10, 2010

(30) Foreign Application Priority Data
Aug. 7, 2007 (JP) ................................. 2007-205518

(51) Int. Cl.
*G09G 5/00* (2006.01)
*G06F 3/033* (2006.01)
(52) U.S. Cl. ........................ 345/184; 200/179
(58) Field of Classification Search .......... 345/156–184; 200/175, 178, 179, 6 R; 74/10 R, 10.1, 10.15, 74/10.2
See application file for complete search history.

(56) References Cited

U.S. PATENT DOCUMENTS

| | | | |
|---|---|---|---|
| 7,248,252 B2 * | 7/2007 | Amari et al. .................. | 345/184 |
| 7,489,303 B1 * | 2/2009 | Pryor ............................ | 345/173 |
| 2002/0105504 A1 * | 8/2002 | Toepke et al. ................ | 345/173 |
| 2006/0022521 A1 * | 2/2006 | Szczerba et al. ............. | 303/191 |
| 2006/0158426 A1 | 7/2006 | Hagiwara | |

FOREIGN PATENT DOCUMENTS

JP U-6-50201 7/1994
(Continued)

OTHER PUBLICATIONS

International Search Report issued in corresponding International Patent Application No. PCT/JP2008/063669, mailed Sep. 2, 2008.

(Continued)

*Primary Examiner* — Stephen Sherman
(74) *Attorney, Agent, or Firm* — Oliff & Berridge, PLC (57) ABSTRACT

A selecting operation and a setting operation for setup items shown on a display are performed with using a selection change switch that can in steps rotate to three positions indicated by marks and a dial switch that is stacked on the selection change switch. The display shows three setup items at three locations. In a case that the selection change switch is rotated and a tip portion of the selection change switch indicates a position, it is thought that the selection operation is performed to select a setup item shown at a location corresponding to the indicated position. Then, the setting operation for the selected setup item is performed by rotating the dial switch. When the selection change switch has pivoted toward near side or far side, a window to be shown at the foreground is changed on the display.

20 Claims, 8 Drawing Sheets

FOREIGN PATENT DOCUMENTS

| | | |
|---|---|---|
| JP | U 7-22431 | 4/1995 |
| JP | A-11-67017 | 3/1999 |
| JP | A-2002-91680 | 3/2002 |
| JP | A-2004-316279 | 11/2004 |
| JP | A 2005-081906 | 3/2005 |
| JP | A 2006-195768 | 7/2006 |
| JP | U-2007-121798 | 5/2007 |

OTHER PUBLICATIONS

Office Action issued in Japanese Patent Application No. 2009-526407 dated Sep. 27, 2011 (with translation).

* cited by examiner

MANIPULATOR

This application is the national phase under 35 U.S.C. §371 of PCT International Application No. PCT/JP2008/063669 which has an International filing date of Jul. 30, 2008 and designated the United States of America.

BACKGROUND OF THE INVENTION

1. Field of the Invention

The present invention relates to a manipulator that accepts setup operations to manipulate electric devices, such as a volume setting of an audio device and a temperature setting of an air conditioner.

2. Description of Related Art

Conventionally, it is known to mount different electric devices on a motor vehicle, such as a car navigation device, audio device and an air conditioner (AC), in order to improve comfort for a driver and a passenger riding on the motor vehicle. A manipulator is arranged near a driver seat, for example, on an instrument panel of the motor vehicle, which includes a plurality of switches, buttons and the like for manipulating these devices. Recently, there are an increasing number of devices mounted on a motor vehicle and an increasing number of functions added to each device. Thus, this tendency requires more switches, buttons and the like to manipulate these devices, and causes problems of low physical arranging space in a motor vehicle.

For this problem, it is practical to use a manipulator that has a reduced number of switches and buttons, by mounting a display, such as a liquid crystal display, on an instrument panel of a motor vehicle and by making the display show different menus. That manipulator may resolve the low physical space problem described above, by increasing the number of menus shown on the display in response to an increase in the number of devices and an increasing in the number of functions of each device.

A patent document 1 discloses: a display apparatus that shows a menu; frame portion that surrounds the display apparatus and a plurality of input devices that are arranged on the frame portion, in order to activate or select a desired function by handling an input device which is located at a position corresponding to a menu shown on the display apparatus.

[Patent document 1] Japanese Patent Application Laid-Open No. 2006-195768

SUMMARY OF THE INVENTION

In a case of showing menus on a display and manipulating devices based on a selected menu, a manipulator may have an advantage that many switches and buttons are not required. However, such a manipulator will cause a problem that there are an increasing number of menus shown on the display or an increasing complication of hierarchical structures of menus in response to an increasing number of devices and an increasing function of each device. An increasing number of menus and an increasing complication of menus may cause poor operability and may cause a user a long time visual inspection of menus. The display apparatus with input devices in the patent document 1 may also cause similar problems.

The present invention was made in view of such circumstances and has a primary object to provide a manipulator that allows a simple and secure setup operation, for example, by including: a first rotary control section that can rotate in steps to a plurality of positions; second rotary control section that is arranged concentrically to the first rotary control section; and a display that shows setup items at a plurality of locations corresponding to positions of the rotating first rotary control section, and by accepting a setting, through the rotation of the second rotary control section, of a setup item that is shown at a location corresponding to a position indicated by an indication portion of the first rotary control section.

Another object of the present invention is to provide a manipulator that allows an easy recognition about a selected setup item, for example, by making the display highlight a setup item selected by the rotation of the first rotary control section.

Another object of the present invention is to provide a manipulator that allows a user to reliably recognize with eyes a selected setup item, for example, by enlarging, color changing and/or blinking of the selected setup item as for the highlight.

Another object of the present invention is to provide a manipulator that is small, allows an easy rotating operation and allows an easy recognition about a position indicated by a rotating first rotary control section, for example, by forming the first rotary control section in an approximate egg-like plate shape having a tip portion as an indication portion, forming a second rotary control section in an approximate disk shape, and by arranging a rotational axis of the first control section to be the same with a rotational axis of the second control section.

Another object of the present invention is to provide a manipulator that makes an indication portion directly indicate a setup item shown by a display and allows an easy recognition about a selected setup item, for example, by arranging the indication portion of a first rotary control section to cover a part of the display.

Another object of the present invention is to provide a manipulator that allows an easy setup operation for more setup items, for example, by utilizing a combination of a pivoting manipulation with allowing a first rotary control section to pivot in a direction intersecting its rotating direction and with making a display change a shown setup item based on a pivot movement of the first rotary control section.

Another object of the present invention is to provide a manipulator that allows an easy and secure change operation for a shown window, for example, by associating the change operation and a pivoting manipulation with each other, with showing on a display a plurality of windows overlaid with each other which respectively comprise a plurality of setup items and with changing a window shown at a foreground on the basis of a pivot movement of a first rotary control section.

Another object of the present invention is to provide a manipulator that easily allows downsizing, for example, by stacking the second rotary control section on the first rotary control section.

Another object of the present invention is to provide a manipulator that easily allows downsizing, for example, by forming a first rotary control section in a cylindrical shape and by arranging a second rotary control section to rotate inside the first control section.

A manipulator according to a first aspect of the present invention accepts an operation selecting a setup item from a plurality of setup items and an operation setting a setup value of the selected setup item, and comprises: a first rotary control section that can rotate in steps to a plurality of positions and comprises an indication portion which indicates a position based on a rotation; a second rotary control section that is arranged concentrically to the first rotary control section; a display that shows setup items at a plurality of locations corresponding to the positions of the rotating first rotary control section; and a display changing means for changing setup items shown by the display; a change operation accepting means for accepting an operation relating a change performed by the display changing means, wherein the manipulator accepts a selection of a setup item shown at a location corresponding to a position indicated by the indication portion, in accordance with the rotating first rotary control section, and the manipulator accepts a setting of a setup value of the selected setup item, in accordance with the rotating second rotary control section.

In accordance with the first aspect of the present invention, a selecting operation and a setting operation are carried out for setup items shown by a display with using a first rotary control section that is allowed to rotate in steps to a plurality of positions and a second rotary control section that is arranged concentrically to the first rotary control section. The setup items are respectively shown at locations on the display which are corresponding to a plurality of positions of the rotating first rotary control section. The selecting operation of a setup item shown at a location on the display is carried out by a rotating operation of the first rotary control section to make an indication portion indicate a position corresponding to the location. In addition, the setting operation for a setup item selected by the first rotary control section is carried out by a rotating operation of the second rotary control section. The positions of the rotating first rotary control section correspond to the locations of the setup items shown on the display. Therefore, it is possible for a user to easily recognize which setup item is selected. If there are several positions that can be indicated by the rotating first rotary control section, a user accustomed to the usage to some extent can handle for the setting operation of setup items, with visual inspection of the display only for a short time or with no visual inspection. Furthermore, a user does not require in the present invention to look for another switch after selecting a setup item because the setting operation can be carried out with using the second rotary control section arranged concentrically to the first rotary control section, although a user requires to look for another switch in a configuration that arranges a switch for the selection operation and another switch for the setting operation.

In a manipulator according to a second aspect of the present invention, the display highlights the selected setup item.

In accordance with the second aspect of the present invention, a setup item is highlighted on the display when being selected by the rotating first rotary control section. Therefore, a user can easily recognize a position indicated by the rotating first rotary control section, in other words, a user can easily recognize a setup item selected by the first rotary control section. This configuration can be particularly effective when there are many positions indicated by the rotating first rotary control section, in other words, when there are many setup items shown on the display.

In a manipulator according to a third aspect of the present invention, the highlighting is performed by enlarging, color changing and/or blinking.

In accordance with the third aspect of the present invention, a setup item is highlighted on the display by enlarging, color changing and/or blinking, when being selected by the rotating first rotary control section. Therefore, a user can visually recognize the highlighted setup item surely and can reliably recognize the setup item to be set.

In a manipulator according to a fourth aspect of the present invention, the first rotary control section is formed in an approximate egg-like plate shape, and has a tip portion as the indication portion, and the second rotary control section is formed in an approximate disk shape.

In accordance with the fourth aspect of the present invention, the first rotary control section is formed in an approximate egg-like plate shape. This shape is suitable for a rotating manipulation because being roughly a circular form. Furthermore, this shape can be utilized to indicate a position represented by the rotating first rotary control section, because having the tip portion. In addition, the second rotary control section is formed in an approximate disk shape. An egg-like shape and a disk shape are similar to each other. Therefore, it is easy to arrange the second rotary control section concentrically to the first rotary control section. Furthermore, a user can easily change a control section to be handled, from the first rotary control section to the second rotary control section or vice versa, because rotation axes of the first rotary control section and the second rotary control section coincide with each other.

In a manipulator according to a fifth aspect of the present invention, the first rotary control section is arranged to make the indication portion cover a part of the display.

In accordance with the fifth aspect of the present invention, the first rotary control section is arranged to make the indication portion cover a part of the display. The display can show a plurality of setup items at locations corresponding to positions indicated by the rotating first rotary control section. Thus, the indication portion of the rotating first rotary control section can directly indicate each setup item. Therefore, a user can recognize a setup item directly indicated by the indication portion of the first rotary control section as an object to be set by the second rotary control section.

In a manipulator according to a sixth aspect of the present invention, the first rotary control section is arranged to allow pivoting in a direction intersecting its rotating direction, and the change operation accepting means accepts an operation based on a pivot movement of the first rotary control section.

In accordance with the sixth aspect of the present invention, the first rotary control section is configured to allow pivoting in a direction intersecting to the rotating direction. For example, a pivot axis is provided on and protrudes along a radial direction from a circumferential surface of the rotational axis formed in a hollow or solid cylindrical shape, and supports the first rotary control section. Thus, the first rotary control section can pivot about the pivot axis. The pivot axis is rotated together with the rotational axis, when the first rotary control section rotates. Furthermore, the pivot movement of the first rotary control section can be detected by using a push button, an electrical contact or the like, and the display can change shown setup items based on the pivot movement. Thus, a user can carry out, by handling only the first rotary control section, a changing operation of the setup items shown by the display and a selecting operation of a setup item from a plurality of setup items shown by the display. Therefore, it is possible to set a large number of setup items only by using the first rotary control section and the second rotary control section.

In a manipulator according to a seventh aspect of the present invention, the display shows a plurality of windows overlaid with each other that respectively comprise a plurality of setup items, and the display changing means changes a window shown at a foreground.

In accordance with the seventh aspect of the present invention, the display shows a plurality of windows overlaid with each other, each of which contains a plurality of setup items. In addition, a window shown at a foreground is changed in accordance with the pivot movement of the first rotary control section. For example, a window at the foreground is slid each time of single pivot movement of the first rotary control section.

In a manipulator according to an eighth aspect of the present invention, the first rotary control section and the second rotary control section are in a stacked arrangement.

In accordance with the eighth aspect of the present invention, the first rotary control section and the second rotary control section are in a stacked arrangement. Therefore, the manipulator can be downsized easier than a manipulator aligning two rotary control sections. The stacked arrangement of two rotary control sections enhances the operability, even when a user sequentially handles the first rotary control section and the second rotary control section.

In a manipulator according to a ninth aspect of the present invention, the first rotary control section is formed in a cylindrical shape, and the second rotary control section is arranged to rotate inside the first rotary control section.

In accordance with the ninth aspect of the present invention, the first rotary control section is formed in a cylindrical shape, and the second rotary control section is arranged to rotate inside the first rotary control section. Therefore, the manipulator can be downsized easier than a manipulator aligning two rotary control sections. The stacked arrangement of two rotary control sections enhances the operability, even when a user sequentially handles the first rotary control section and the second rotary control section.

The first aspect of the present invention does not require many switches, many buttons or the like, for the manipulator, because the selecting operation and the setting operation can be carried out with using the first rotary control section and the second rotary control section that are arranged concentrically to each other. In addition, the first aspect of the present invention can allow downsizing of the manipulator. Therefore, it is possible to easily arrange the manipulator on a limited space, such as an instrument panel of a motor vehicle. In addition, the display shows setup items at locations corresponding to positions indicated by the rotating first rotary control section, and the second rotary control section contributes in the setting operation for a setup item indicated by the indication portion of the first rotary control section. Therefore, a user can easily recognize which setup item is selected, because the rotation of the first rotary control section is associated with the setup items shown on the display. Hence, a user can handle for the setting operation of setup items, with visual inspection of the display only for a short time or with no visual inspection. For the reasons described above, these configurations can enhance the operability. In a case that this manipulator is mounted on a motor vehicle, a user may handle this manipulator without visual inspection. Therefore, the manipulator will not interfere with driving the motor vehicle, and will enhance the safety of driving the motor vehicle.

The second aspect of the present invention highlights on the display the setup item selected by the rotating first rotary control section. Thus, a user can easily recognize the selected setup item. Therefore, it is possible to enhance the operability of the manipulator and to reduce user's wrong handling.

The third aspect of the present invention performs enlarging, color changing and/or blinking, as highlighting, of the setup item selected by the rotating first rotary control section. Thus, a user can visually recognize the selected setup item, surely. Therefore, a user can surely recognize the setup item to be set. Hence, it is possible to enhance the operability of the manipulator and to reduce user's wrong handling.

The fourth aspect of the present invention utilizes the first rotary control section formed in an approximate egg-like plate shape whose tip portion is referred to as indication portion and utilizes the second rotary control section formed in an approximate disk shape. Thus, a user can easily manipulate for the rotating operation, and can easily recognize a position indicated by the rotating first rotary control section. Therefore, it is possible to surely enhance the operability of the manipulator.

The fifth aspect of the present invention utilizes the first rotary control section having the indication portion which covers a part of the display. Thus, the indication portion can directly indicate the setup items shown on the display. Therefore, a user can recognize the setup item directly indicated by the indication portion of the first rotary control section as an object to be set. Hence, it is possible to enhance the operability of the manipulator and reduce user's wrong handling.

The sixth aspect of the present invention allows the first rotary control section to pivot in a direction intersecting to the rotating direction and allows the display to change the shown setup items based on the pivot movement. Thus, it is possible, by utilizing only the first rotary control section, to change the setup items shown by the display and to select one setup item from a plurality of shown setup items. Furthermore, it is possible to treat much more setup items for setting operations by utilizing the first rotary control section and the second rotary control section. Therefore, it is possible to increase the number of functions of the manipulator, without increasing the size of the manipulator. Hence, it is possible to enhance the convenience of the manipulator, without reducing the operability.

The seventh aspect of the present invention shows a plurality of windows overlaid with each other, each of which has a plurality of setup items, and changes a window shown at the foreground in response to the pivot movement of the first rotary control section. Thus, it is possible to change the shown setup items easily and surely, because the pivot movement of the first rotary control section is associated with the change of the showing window. Therefore, it is possible to increase functions and enhance the convenience of the manipulator.

The eighth aspect of the present invention utilizes the first rotary control section and the second rotary control section in a stacked arrangement. Thus, it is possible to save the space for arranging the first rotary control section and the second rotary control section. Therefore, the manipulator can be downsized and a user can easily change to handle a rotary control section. Hence, it is possible to enhance the operability of the manipulator.

The ninth aspect of the present invention utilizes the first rotary control section formed in a cylindrical shape and the second rotary control section arranged to rotate inside the first rotary control section. Thus, it is possible to save the space for arranging the first rotary control section and the second rotary control section. Therefore, the manipulator can be downsized and a user can easily change to handle a rotary control section. Hence, it is possible to enhance the operability of the manipulator.

The above and further objects and features of the invention will more fully be apparent from the following detailed description with accompanying drawings.

DESCRIPTION OF THE PREFERRED EMBODIMENTS (Embodiment 1)

Figure 1:
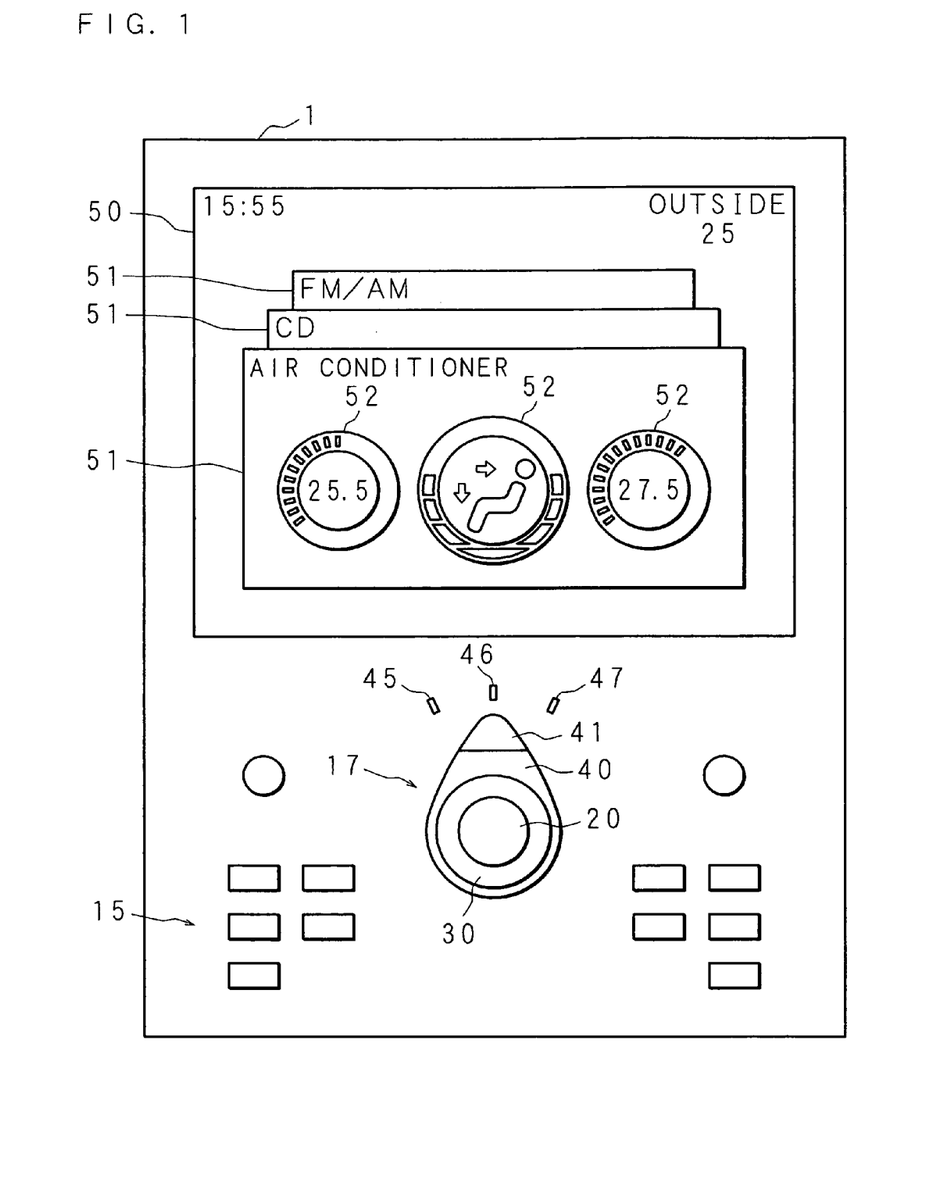
FIG. 1 is a schematic view showing an appearance of a manipulator according to an embodiment 1 of the present invention.

Hereinafter, the present invention is described in detail with reference to drawings illustrating an embodiment according to the present invention. FIG. 1 is a schematic view showing an appearance of a manipulator according to an embodiment 1 of the present invention. A manipulator 1 of the embodiment 1 is mounted on, for example, an instrument panel of a motor vehicle implying, for example, a car, and accepts various setting operations for devices mounted on the motor vehicle, such as an air conditioner, CD player and a radio tuner. The manipulator 1 includes: a display 50 that shows various information, setup items and the like; switch compound 17 that is composed of three switches; and a control panel 15 that is provided with different switches, buttons or the like.

Figure 2A:
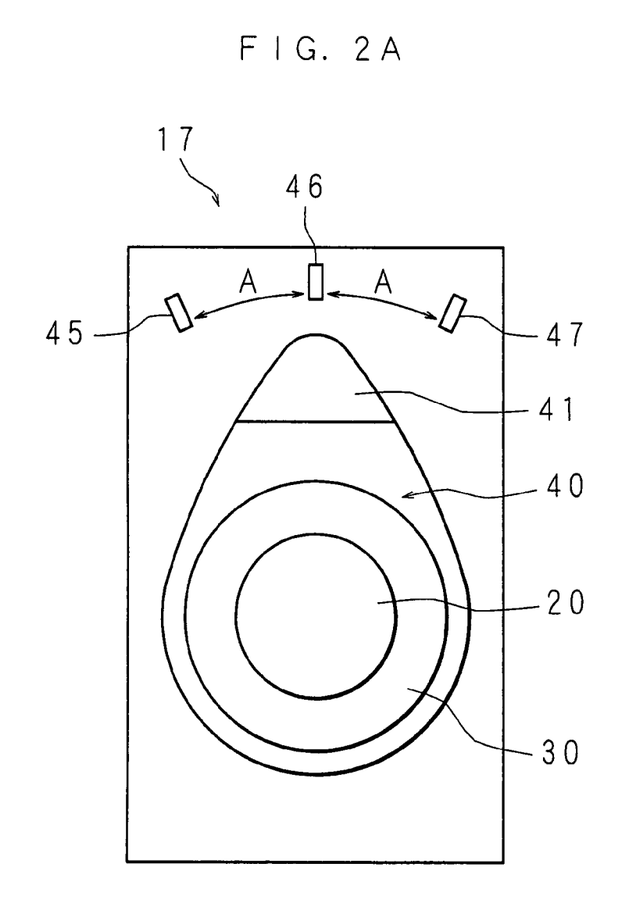
FIG. 2A and FIG. 2B are schematic views showing configurations of a switch compound according to the embodiment 1 of the present invention.
Figure 2B:
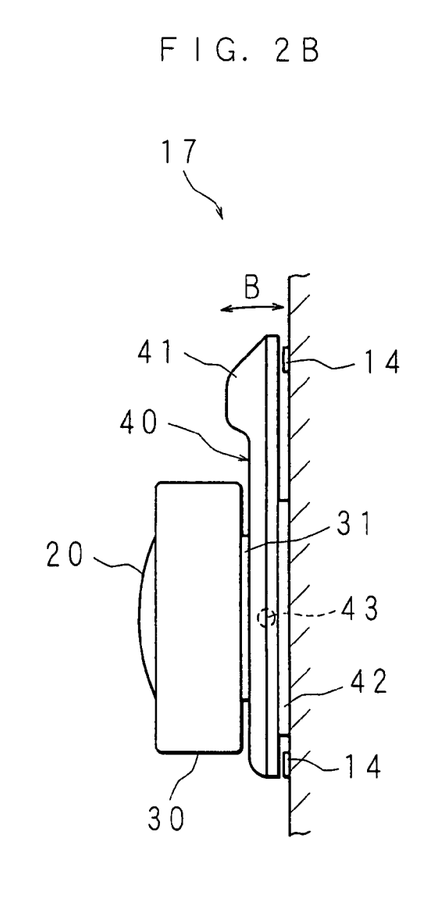

FIG. 2A and FIG. 2B are schematic views showing configurations of the switch compound 17 according to the embodiment 1 of the present invention. FIG. 2A shows the switch compound 17 in a plan view, and FIG. 2B shows the switch compound 17 in a side view. The switch compound 17 is composed of three switches: a push-button switch 20, dial switch 30 and a selection change switch 40. The selection change switch 40 is formed in an approximate egg-like plate shape whose tapered tip portion 41 is thicker than other portion of the selection change switch 40. In addition, the manipulator 1 includes a hollow cylindrical rotational axis 42 protruding from a housing of the manipulator 1 (or the instrument panel of the motor vehicle). The selection change switch 40 is arranged to rotate together with the rotational axis 42, and further arranged to pivot about a pivot axis 43 substantially perpendicular to the rotational axis 42.

Particularly, a through-hole is formed in an approximate circular shape onto the selection change switch 40, in order to insert the rotational axis 42. Two pivot axes 43 (only one pivot axis is shown in FIG. 2B), each of which is formed in a round rod-like shape, are arranged to protrude from outer circumference surfaces of the rotational axis 42 in radial directions, and arranged to face with each other. The through-hole of the selection change switch 40 is provided with hold portions (not shown) on the inner circumference surface at opposing positions, in order to hold the pivot axes 43. By inserting the rotational axes 42 through the through-hole of the selection change switch 40 and by making the hold portions hold the pivot axes 43, the selection change switch 40 is fixed pivotally about the pivot axes 43. Thus, a tip portion 41 of the selection change switch 40 can be moved close to and away from an outer circumference surface of the housing of the manipulator 1 (arrow B in FIG. 2B). In addition, the rotational axis 42 is arranged in a rotatable manner, for example, on a circuit board in the housing of the manipulator 1. When the pivot axes 43 are held by the selection change switch 40, it is possible to rotate together the selection change switch 40 and the rotational axis 42.

The selection change switch 40 and the rotational axes 42 can rotate in steps to three positions: a center position, left position inclined from 30 degrees to 60 degrees away from the center position, and a right position inclined from 30 degrees to 60 degrees away from the center position (arrows A in FIG. 2A). The selection change switch 40 and the rotational axes 42 are prevented from rotating over these ranges. The stepped rotation may be implemented, for example, with an engagement of a concavity and a convexity to generate clicking feel. The clicking feel comes from, for example, clicking noises generated by the engagement of a concavity and a convexity and vibrations generated together with the clocking noises. The outer circumference surface of the housing of the manipulator 1 is provided with marks 45-47, for example, by printing, at three positions to be indicated by the tip portion 41 of the selection change switch 40 rotating to the center position, left position and the right position. A user can operate the selection change switch 40 to make the tip portion 41 match with any one of these marks 45-47 for a rotating operation.

In addition, the manipulator 1 includes a pivot movement detection unit 14 to detect a pivot movement of the selection change switch 40. There is a little clearance between the tip portion 41 of the selection change switch 40 and the outer circumference of the housing of the manipulator 1, in order to make the selection change switch 40 possible to pivot. The pivot movement detection unit 14 is implanted in push switches arranged within the clearance, in the embodiment 1. As shown in FIG. 2B, a first push switch and a second push switch are arranged between the selection change switch 40 and the outer circumference surface of the housing, and the rotational axis 42 is positioned between the first push switch and the second push switch. Thus, the first push switch is pushed down by the selection change switch 40 pivoting close to the outer circumference surface of the housing, and the second push switch is pushed down by the selection change switch 40 pivoting away from the outer circumference surface of the housing. Therefore, it is possible to detect the pivot movement of the selection change switch 40.

The dial switch 30 is formed in an approximate disk shape. The manipulator 1 includes a rotational axis 31 that is formed in a hollow or solid cylindrical shape, inserted through a through-hole of the hollow cylindrical rotational axis 42 and through a through-hole of the selection change switch 40, and is mounted in a rotatable manner, for example, on the circuit board in the housing. The dial switch 30 is fixed to the rotational axis 31 and can rotate together with the rotational axis 31. Thus, the dial switch 30 is stacked along the axial direction on the selection change switch 40. The dial switch 30 can rotate through 360 degrees or no less than 360 degrees, clockwise and anticlockwise. It should be noted that the dial switch 30 may be configured to generate the clicking feel based on a predetermined rotation range of the rotating dial switch 30. In such a case, the clicking feel is preferably changed in accordance with the position indicated by the rotating selection change switch 40 (intervals generating the clicking feel are changed, intensity of the clicking feel is changed, or the like). The change of the clicking feel is implemented in preparing plural pairs of a concavity and a convexity, each of which has different shapes from another pair, and in changing the pair for engagement in accordance with the position indicated by the rotating selection change switch 40. Alternatively, the change of the clicking feel may be implemented electrically in utilizing a motor, actuator and the like. As it is configured to generate the clicking feel in response to the rotation of the dial switch 30, it is possible to prevent the dial switch 30 from being wrongly rotated by the rotating operation of the selection change switch 40. Furthermore, a user can recognize the wrong rotation of the dial switch 30 even if the dial switch 30 happens to rotate in response to the rotating operation of the selection change switch 40. In addition, a locking mechanism may be provided to lock the rotation of the dial switch 30 and a user may rotate the dial switch 30 with pushing an unlock button for the rotating operation, in order to prevent the dial switch 30 from being wrongly rotated during the rotation operation of the selection change switch 40.

The push-button switch 20 is formed in an approximate round shape, and arranged at a substantial center on an end face of the dial switch 30, as the end face is formed in an approximate round shape. The push-button switch 20 is connected, for example, to the circuit board arranged inside the housing of the manipulator 1, for example, via a cable passing through the dial switch 30 and the rotational axis 31. Thus, it is possible to detect a push operation for the push-button switch 20.

In addition, the manipulator is provided with other switches, around the switch compound 17 (control panel 15). Thus, it is configured to perform operations with handling the control panel 15 for various functions that cannot be provided by the switch compound 17. Although each switch of the control panel 15 may be preferably assigned to a function having a relatively low operation frequency, each switch of the control panel 15 may be contrarily assigned to a function having an extremely high operation frequency and requiring one independent switch.

The display 50 can show setup items 52, such as menus or icons, which can be selected and be set with using the switch compound 17. The display 50 further can show information, such as present time and outside temperature of the motor vehicle. The display 50 is implemented, for example, in a liquid crystal display. The display 50 is configured to show three windows 51, and these three windows 51 are shown in an overlay arrangement from the front to the rear on the display 50, in a so-called 3D views. In each window 51, setup items 52 are aligned for setting operations of one device. In one example shown by FIG. 1, a window 51 is shown at the foreground (front row) which has setup items 52 for the air conditioner, window 51 is shown at the middle-ground for the CD player, and a window 51 is shown at the background for the radio tuner.

In each window 51, three (or less than three) set up items 52 are aligned laterally, particularly, at the center location, left location and the right location. Each setup item 52 is depicted by an icon formed in an approximate round shape that represents the dial switch 30 of the switch compound 17. The example shown in FIG. 1 has setup items 52 for the air conditioner: the left setup item 52 for setting temperature of the passenger seat in the motor vehicle; center setup item 52 for setting-airflow of the air conditioner; and the right setup item 52 for setting temperature of the driver seat in the motor vehicle.

In the both setup items 52 for setting temperature of the passenger seat and the driver seat, a setting temperature is expressed as a number at the center of the round icon and as an indicator around the number, while the indicator has calibration marks whose fluctuating number indicates the setting temperature. The indicator for the setting temperature is configured to have an increasing number of calibration marks depicted along clockwise direction when the setting temperature is higher, and have a decreasing number of calibration marks depicted along anticlockwise direction when the setting temperature is lower. In the setup item 52 for setting airflow of the air conditioner, settings of airflow direction are schematically depicted at the center of the round icon. Around the depicted settings of airflow direction, indicators are depicted, each of which has calibration marks whose fluctuating number indicates the setting amount of airflow. The indicators for setting amount of airflow are configured to simultaneously fluctuate the numbers of respective calibration marks. Thus, increasing numbers of respective calibration marks are depicted upward when the setting amount of airflow is larger, and decreasing numbers of respective calibration marks are depicted downward when the setting amount of airflow is smaller.

While one window 51 has a setup item 52 shown at the center location, setup item 52 shown at the left location and a setup item 52 shown at the right location, these locations are associated with the three positions indicated by the rotating selection change switch 40 of the switch compound 17, particularly, the center position, left position and the right position. A user can manipulate the selection change switch 40 to make the tip portion 41 match with any one of these marks 45-47 for a rotating operation, and thus can select one setup item 52 among three setup items shown in a window 51 on the display 50.

The example shown in FIG. 1 illustrates a selected condition of the setup item 52, for setting amount of airflow, which is shown at the center of the window 51 for the air conditioner, because the tip portion 41 of the selection change switch 40 is at the position indicating the center mark 46. In the embodiment 1, the display 50 is configured to show a selected setup item larger, by enlargement, than the other setup items 52 among three setup items 52 in a single window 51. A user can change airflow amount, by rotating the dial switch 30 in this condition. For example, airflow amount is increased when a user rotates the dial switch 30 clockwise, and airflow amount is reduced when a user rotates the dial switch 30 anticlockwise. It may be configured that a user can set the airflow direction, in a toggle type manner, by pushing the push-button switch 20 in this condition, or can set the airflow direction by handling another switch on the control panel 15.

Figure 3A:
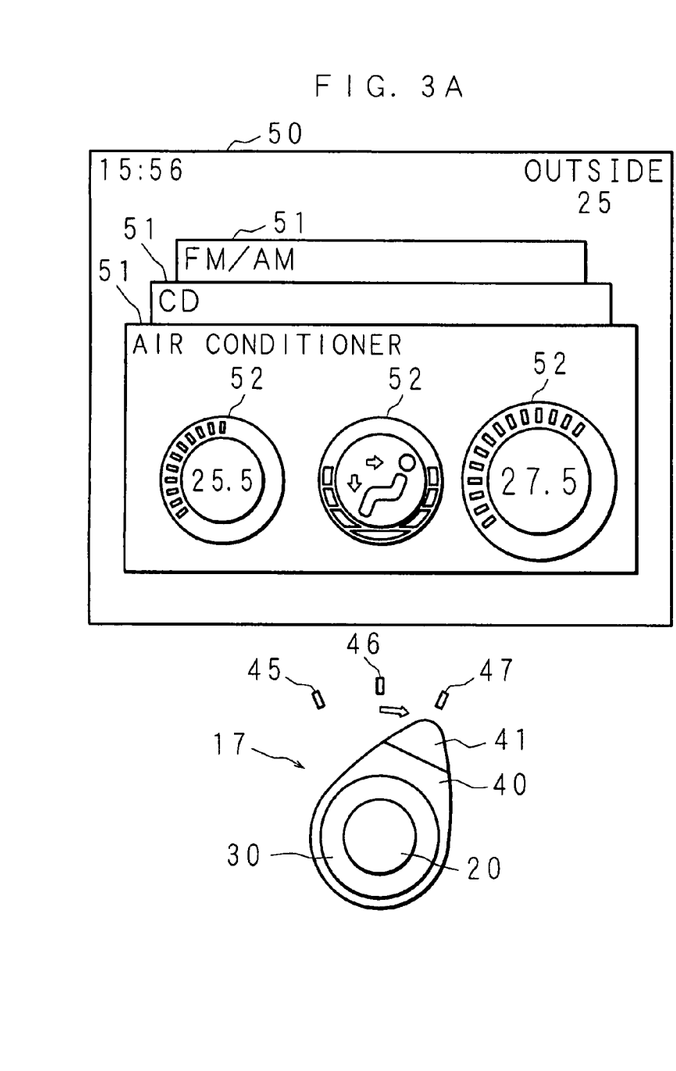
FIG. 3A and FIG. 3B are schematic views respectively illustrating a selecting operation and a setting operation with the switch compound of the manipulator according to the embodiment 1 of the present invention.
Figure 3B:
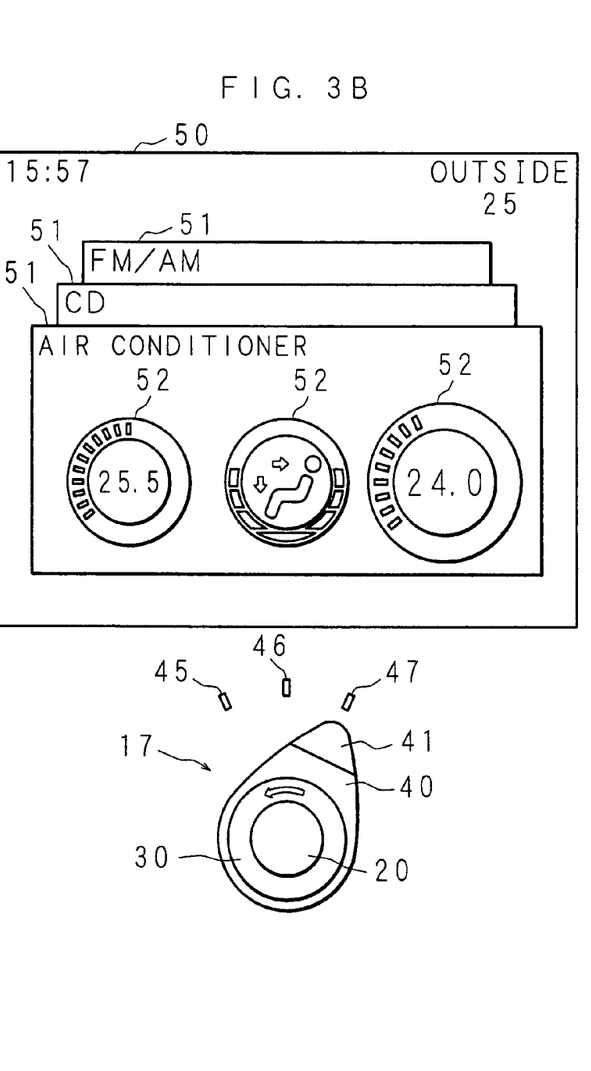

FIG. 3A and 3B are schematic views respectively illustrating a selecting operation and a setting operation with the switch compound 17 of the manipulator 1 according to the embodiment 1 of the present invention. FIG. 3A illustrates a condition that the tip portion 41 has moved to the position indicating the right mark 47 after a user has rotated the selection change switch 40 clockwise at the condition shown in FIG. 1. Thus, a user can perform a selection operation to select a setup item 52 shown at the right location for setting temperature of the driver seat, among three setup items 52 shown within the window 51. As the selection has been changed from the setup item 52 for setting amount of airflow to another setup item 52 for setting temperature of the driver seat, the display 50 in FIG. 3A stops enlarging the setup item 52 shown for setting amount of airflow and enlarges another setup item 52 shown for setting temperature of the driver seat.

After the setup item 52 has been selected for setting temperature of the driver seat, a user can perform a setting operation for the driver seat temperature by rotating the dial switch 30 (FIG. 3B). When a user rotates the dial switch 30 anticlockwise as shown by a hollow arrow in FIG. 3B, the driver seat temperature is decreased. When a user rotates the dial switch 30 clockwise in contrast, the driver seat temperature is increased. While being omitted to show an explanation drawing, the setting operation for the passenger seat temperature is similar to the setting operation for the driver seat temperature. A user can perform a selecting operation to select a setup item 52 for setting temperature of the passenger seat, by rotating the selection change switch 40 to a position corresponding to the left mark 45, and then can perform a setting operation for the passenger seat temperature, by rotating the dial switch 30.

The manipulator 1 can accept setting operations not only for a performance of the air conditioner but also for performances of the CD player and the radio tuner. Each window 51 includes setup items 52 for setting one device. Therefore, the manipulator 1 can change a device to be set by changing a window 51 shown at the foreground on the display 50. The window 51 at the foreground is changed by a pivot operation of the selection change switch 40 of the switch compound 17.

Figure 4A:
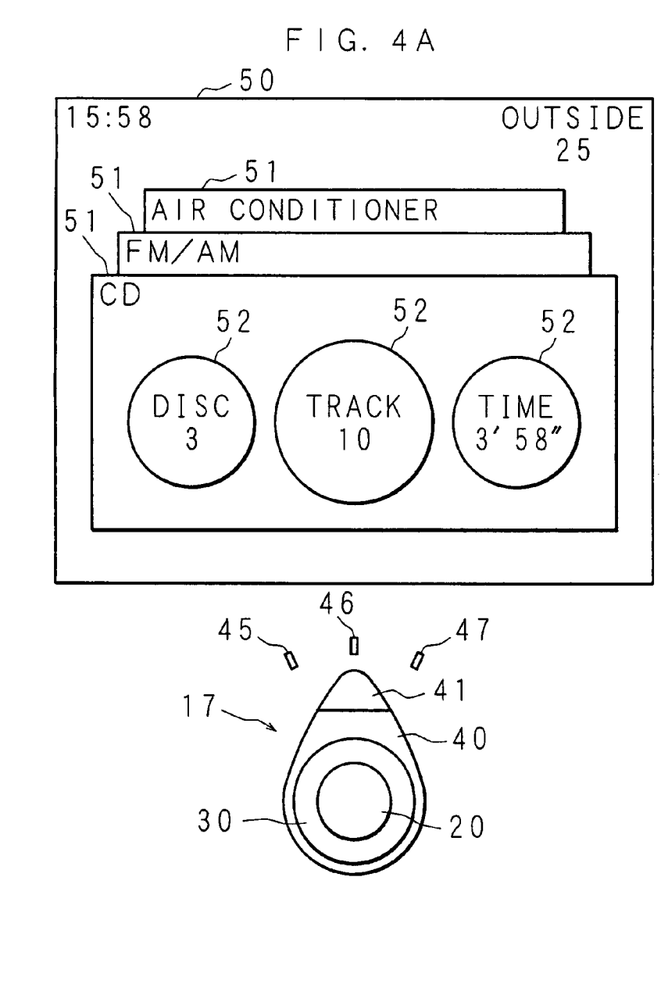
FIG. 4A and FIG. 4B are schematic views respectively illustrating a display changing operation for a window with the switch compound of the manipulator according to the embodiment 1 of the present invention.
Figure 4B:
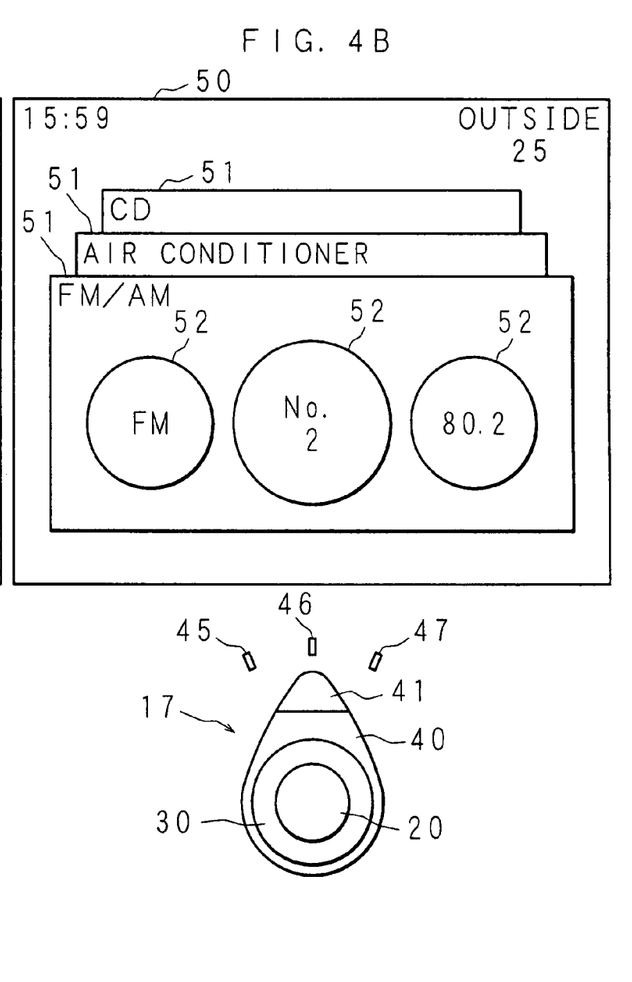

FIG. 4A and FIG. 4B are schematic views respectively illustrating a display changing operation for a window 51 with the switch compound 17 of the manipulator 1 according to the embodiment 1 of the present invention. A window 51 for the CD player is shown behind the window 51 for the air conditioner, in an overlay arrangement, at the condition shown in FIG. 1. When a user pivots the tip portion 41 of the selection change switch 40 toward near side (a direction away from the outer circumference surface of the housing of the manipulator 1), the window 51 shown for the CD player is shifted to near side (to the foreground) and the window 51 shown for the air conditioner is shifted to the background (behind a window 51 shown for the radio tuner) in an overlay arrangement (FIG. 4A). Therefore, it is possible to change a window 51 to be shown at the foreground, from the window 51 for the air conditioner to the window 51 for the CD player. Then, a user can perform a setting operation for the CD player with using the switch compound 17.

An example shown in FIG. 4A has a window 51 for the CD player which includes: a setup item 52 shown at the left location for disk number of the CD to be played (for example, a number from 1 to 5 in a case that the CD player can play a CD selected from 5 CDs); setup item 52 shown at the center location for track number to be played in the CD represented by the disk number; and a setup item 52 shown at the right location for playing time of music represented by the track number. Similar to the setting operation for the air conditioner shown in FIG. 3, a user can perform a selecting operation for selecting any one of setup items 52 among the setup item 52 for disk number, setup item 52 for track number and the setup item 52 for playing time, by rotating the selection change switch 40 of the switch compound 17. Furthermore, a user can perform a setting operation for the selected setup item 52 by rotating the dial switch 30.

The window 51 for the radio tuner is shown under the window 51 for the CD player (i.e., at the background) in an overlay arrangement at the condition shown in FIG. 1. When a user pivots the tip portion 41 of the selection change switch 40 toward far side (a direction closing to the outer circumference surface of the housing of the manipulator 1), the window 51 shown for the radio tuner is shifted to the foreground and the window 51 shown for the air conditioner is shifted to under the window 51 shown for the radio tuner, in an overlay arrangement (FIG. 4B). The same condition is generated even when a user pivots the tip portion of the selection change switch 40 toward near side at the condition shown in FIG. 4A. Therefore, it is possible to change a window 51 to be shown at the foreground, to the window 51 shown for the radio tuner from another window 51. Then, a user can perform a setting operation for the radio tuner with using the switch compound 17.

An example shown in FIG. 4B has a window 51 for the radio tuner which includes: a setup item 52 shown at the left location for changing FM/AM; setup item 52 shown at the center location for number of radio station previously registered; and a setup item 52 shown at the right location for receive frequency. Similar to the selecting operation and the setting operation described above, a user can perform a selecting operation for selecting any one of setup items 52 among the setup item 52 for changing FM/AM, setup item 52 for number of radio station and the setup item 52 for receive frequency, by rotating the selection change switch 40 of the switch compound 17, and further can perform a setting operation for the selected setup item 52 by rotating the dial switch 30.

Figure 5:
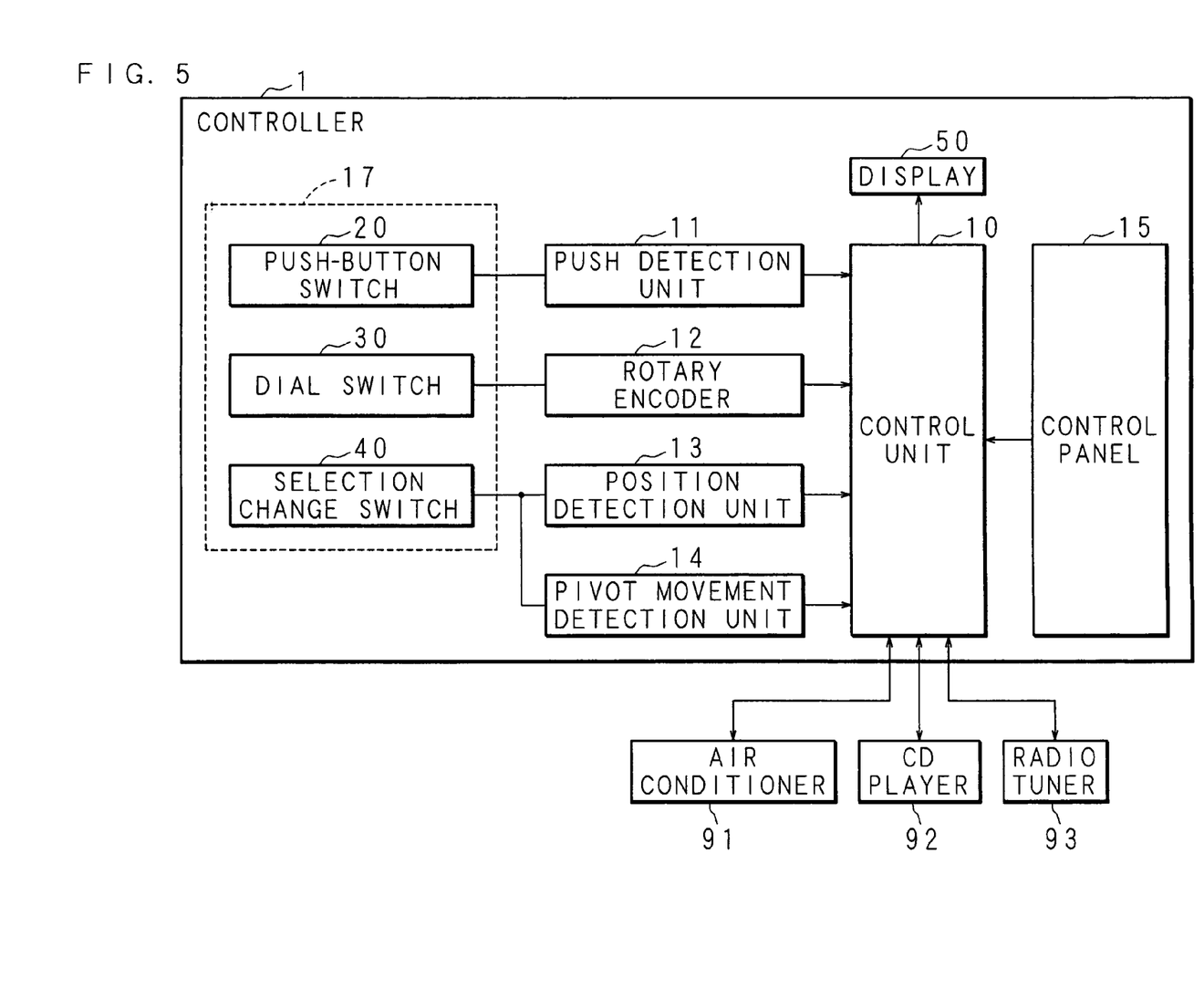
FIG. 5 is a block diagram showing a configuration of the manipulator according to the embodiment 1 of the present invention.

FIG. 5 is a block diagram showing a configuration of the manipulator 1 according to the embodiment 1 of the present invention. The manipulator 1 includes: a push detection unit 11 that detects a push operation for the push-button switch 20; rotary encoder 12 that detects a rotation amount of the dial switch 30; position detection unit 13 that detects a position indicated by the rotating selection change switch 40; pivot movement detection unit 14 that detects a pivot operation for the selection change switch 40; control unit 10 that mainly contributes to a process to show menus or icons on the display 50 based on detection results of these units; and the like. These units are connected, for example, to the circuit board arranged inside the housing of the manipulator 1, and are configured as electric circuits.

The push detection unit 11 changes electrical conditions between conducting and non-conducting in response to the push operation of the push-button switch 20 in order to detect the push operation of the push-button switch 20, for example, with using an electrical contact point. The push detection unit 11 is configured to inform of the detection result to the control unit 10 when having detected the push operation of the push-button switch 20.

The rotary encoder 12 includes: a fixed portion that is fixed for example, to the circuit board; and a rotor that is held in a rotatable manner at the fixed portion. The rotary encoder 12 outputs pulse signal in accordance with a rotation of the rotor. The rotor of the rotary encoder 12 is connected to the rotational axis 31 of the dial switch 30. Thus, the rotary encoder 12 outputs the pulse signal in accordance with the rotate operation of the dial switch 30. The control unit 10 can obtain information about the rotating direction and the rotating amount of the dial switch 30 and the like, on the basis of the pulse signal outputted from the rotary encoder 12.

The position detection unit 13 is configured, for example, with using a three-contact lever switch, and moves a lever of the lever switch in accordance with the rotation of the rotational axis 42 of the selection change switch 40, in order to detect the position. The position detection unit 13 is configured to inform of the detected position to the control unit 10. The pivot movement detection unit 14 detects whether any one of two push switches is pushed or not which are arranged to sandwich the rotational axis 42 as described above, in order to detect the pivot movement of the selection change switch 40. The pivot movement detection unit 14 is configured to inform of the detection results to the control unit 10, when having detected the pivot movement with a push switch that has been pushed.

The control unit 10 accepts: the detection results about push operation from the push detection unit 11; pulse signal from the rotary encoder 12; detection results about position indicated by the rotation from the position detection unit 13; detection results about pivot operation from the pivot movement detection unit 13; and the detection results about operation of switches on the control panel 15. The control unit 10 is configured to update information shown on the display 50 based on the operational conditions for the switch compound 17 and the control panel 15. In addition, the control unit 10 is connected to the air conditioner 91, CD player 92 and the radio tuner 93, for example, with connection cables. The control unit 10 is further configured to control the performances of the air conditioner 91, CD player 92 and the radio tuner 93 in accordance with contents of the settings, in order to reflect the various settings based on the operations for the switch compound 17 and the control panel 15.

For example, when the pivot movement detection unit 14 has detected the pivot operation for the selection change switch 40, the control unit 10 changes the shown order of these three windows 51 on the display 50. When the tip portion 41 of the selection change switch 40 has pivoted toward far side in response to the pivot operation (when one of the push switches has been pushed which has been at a side of the tip portion 41), a window 51 having been shown behind a window 51 at the foreground is shifted to the foreground and the window 51 having been shown at the foreground is shifted to the background.

When the selection change switch 40 has been rotated and the position indicated by the rotation has been changed, the changed position is detected by the position detection unit 13 and the control unit 10 controls to enlarge a setup item 52 shown at a location corresponding to the detected position. When the tip portion 41 of the selection change switch 40 has been rotated to a position indicating the left mark 45, the control unit 10 controls to enlarge the setup item 52 shown at the left location within the window 51 on the display 50. When the tip portion 41 of the selection change switch 40 has been rotated to a position indicating the center mark 46, the control unit 10 controls to enlarge the setup item 52 shown at the center location within the window 51 on the display 50. When the tip portion 41 of the selection change switch 40 has been rotated to a position indicating the right mark 47, the control unit 10 controls to enlarge the setup item 52 shown at the left location within the window 51 on the display 50.

When the dial switch has been rotated, the control unit 10 obtains information about the rotating direction and the rotating amount of the dial switch 30 from the pulse signal outputted by the rotary encoder 12. The control unit 10 then changes a setting value of the setup item 52 enlarged within the window 51 at the foreground on the display 50 in accordance with the rotating direction and the rotating amount of the dial switch 30, in order to properly manipulate the air conditioner 91, CD player, or the radio tuner 93 whose setting is to be changed.

In the manipulator 1 described above, it is configured to perform the changing operation of the plural windows 51 shown on the display 50, selecting operation of the plural setup items 52 shown within the window 51 and the setting operation of the selected setup item 52, with using the switch compound 17 composed of the selection change switch 40 and the dial switch 30 which are arranged in a stacked manner. Thus, it is possible to perform setting for plural setup items 52 with using only the switch compound 17. Therefore, it is possible to reduce the number of switches or buttons except for the switch compound 17 on the manipulator 1, and to reduce the size of the manipulator 1. These configurations lead advantages that the manipulator 1 can be easily arranged in a limited space, such as an instrument panel of a motor vehicle.

In the manipulator 1 described above, it is configured to present three setup items 52 at the left, center and the right locations within the window 51 shown on the display 50, in corresponding to the three positions indicated by the rotating selection change switch 40 (the left, center and the right positions). Furthermore, it is configured to accept the selecting operation for selecting any one of the three setup items 52 when the tip portion 41 of the selection change switch 40 has been rotated to a position indicating any one of the marks 45-47 at the three positions. Thus, a user can easily recognize which setup item 52 is selected. Therefore, a user can handle for the setting operation of setup items 52, with visual inspection of the display only for a short time or with no visual inspection. Furthermore, it is possible to enhance the operability of the manipulator 1. In a case that this manipulator 1 is mounted on a motor vehicle, a user can handle this manipulator 1 without visual inspection. Therefore, the manipulator 1 will not interfere with driving the motor vehicle, and will enhance the safety of driving the motor vehicle.

In the manipulator 1 described above, it is configured to enlarge a setup item 52 on the display which is selected by the rotating selection change switch 40. Thus, a user can easily and surely recognize the selected setup item 52. Therefore, it is possible to surely enhance the operability of the manipulator 1 and to surely reduce user's wrong handling.

In the manipulator 1 described above, it is configured to utilize the selection change switch 40 formed in an approximate egg-like plate shape whose pointed tip portion 41 is an indication portion, and to utilize the dial switch 30 formed in an approximate disk shape. Therefore, a user can easily perform the rotating operation, and can easily recognize a position indicated by the rotating first rotary control section. In the manipulator 1 described above, it is further configured to utilize the selection change switch 40 and the dial switch 30 which are arranged concentrically in a stacked manner. Thus, it is possible to save the space for arranging the selection change switch 40 and the dial switch 30. Moreover, a user can easily handle the dial switch 30 even after handling the selection change switch 40. Therefore, it is possible to surely downsize the manipulator 1 and to surely enhance the operability of the manipulator 1.

In the manipulator 1 described above, it is configured to overlay the three windows 51 shown on the display 50, each of which includes setup items 52 for the air conditioner, CD player or the radio tuner. Furthermore, it is configured to make the selection change switch 40 possible to pivot in a direction intersecting to the rotating direction. Moreover, it is configured to change the window 51 to be shown at the foreground in response to the pivot movement of the selection change switch 40. Thus, it is possible to change the setup items 52 shown on the display 50 easily and surely, because the pivot movement of selection change switch 40 is associated with the change of the windows 51 shown on the display 50. Therefore, it is possible to increase the number of functions and enhance the convenience of the manipulator 1.

In the embodiment 1 according to the present invention, the manipulator 1 is mounted on a motor vehicle. However, the present invention is not limited to that configuration, and the manipulator 1 may be mounted on someplace except for a motor vehicle. The manipulator 1 according to the present invention is suitable for being mounted on a place whose arranging space is limited. Furthermore, in the embodiment 1 according to the present invention, the manipulator 1 was illustrated to accept setting operations of setup items 52 for the aid conditioner, CD player and the radio tuner. However, the present invention is not limited to that configuration, and the manipulator 1 may accept setting operations for other devices.

In the embodiment 1 according to the present invention, the selection change switch 40 is illustrated to rotate to the left position, center position, and the right position. However, the present invention is not limited to that illustration, and the selection change switch 40 may rotate to positions no more than 3 or to positions no less than 3. Further, FIG. 1, FIG. 3A, FIG. 3B, FIG. 4A and FIG. 4B illustrated examples about the display contents of the display 50, however, the present invention is not limited to these examples. The display 50 may show, in an overlay arrangement, windows 51 no more than 3 or no less than 3. Furthermore, each window 51 is illustrated to include 3 setup items 52. However, the present invention is not limited to that illustration. Each window 51 may include setup items 52 no more than 4 (i.e., no more than a number of the positions for the rotating selection change switch 40). Moreover, the manipulator 1 is illustrated to have 3 marks 45-47, at positions corresponding to the three positions for the rotating selection change switch 40, on the outer circumference surface of the housing. However, the present invention is not limited to that illustration. The manipulator 1 may have no marks 45-47. In addition, the display 50 was composed of, for example, a liquid crystal display. The display 50 may show objects in a colored presentation or in a monochrome presentation. The display 50 may show objects in a dot presentation or a segment presentation.

In the embodiment 1 according to the present invention, the display 50 is illustrated to enlarge one setup item 52 shown on the display 50 and selected by the selection change switch 40. However, the present invention is not limited to that illustration. The display 50 may highlight the selected setup item 52 in a different method, such as a changing color method or a blinking method. It may be configured that a plurality of illuminants are arranged in the switch compound 17, setup items 52 on the display 50 are respectively shown with different colors, and that the switch compound 17 emits light with a color corresponding to the color of the selected setup item 52.

In the embodiment 1 according to the present invention, the selection change switch 40 is formed in an approximate egg-like shape. However, the present invention is not limited to that formation. The selection change switch 40 may be formed in a different shape that can at least represent the position for the rotating selection change switch 40 or that has an indication portion at one place, such as an arrow shape or a rhombic shape. Furthermore, in the embodiment 1 according to the present invention, it is configured to utilize the pointed tip portion 41 as the indication portion. However, the present invention is not limited to that configuration. It may be configured, for example, that the selection change switch 40 has one portion painted with a different color from the other portions, a mark is provided to one portion of the selection change switch 40, or that the selection change switch 40 has one portion made of a different material from the other portions, in order to provide the indication portion.

In the embodiment 1 according to the present invention, the pivot movement of the selection change switch 40 is detected by two push switches of the pivot movement detection unit 14. However, the present invention is not limited to that detection method, and may utilize another detection method. Although two push switches of the pivot movement detection unit 14 are arranged to detect the selection change switch 40 pivoting far side and near side for the detection method, any one of two push switches may be arranged to detect the selection change switch 40 pivoting far side or near side.

Furthermore, although the control panel 15 was illustrated to have other switches, the control panel 15 may have no such other switches.

(Alternative Embodiment)

Figure 6:
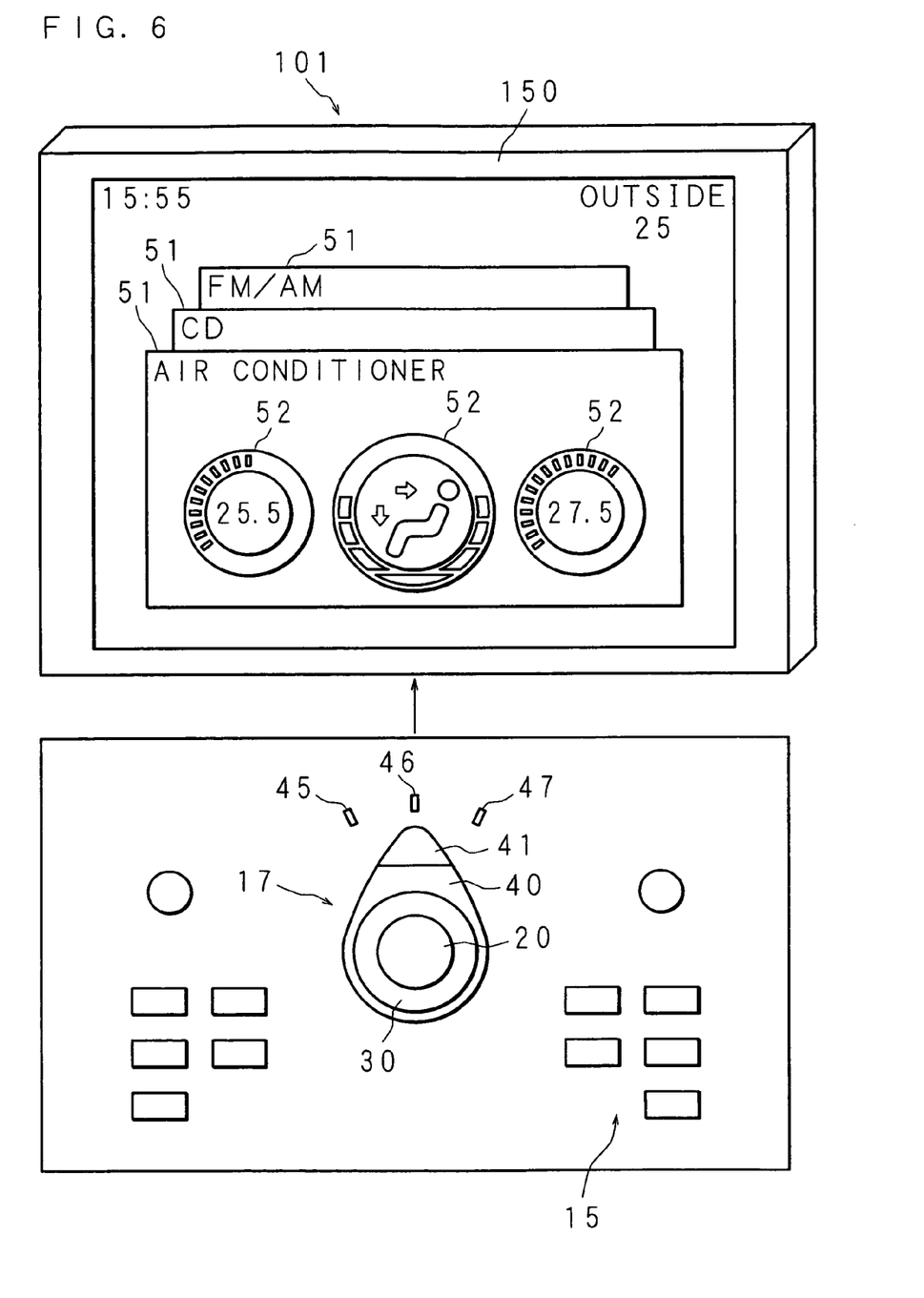
FIG. 6 is a schematic view showing an appearance of a manipulator according to an alternative embodiment for the embodiment 1 of the present invention.

FIG. 6 is a schematic view showing an appearance of a manipulator 101 according to an alternative embodiment for the embodiment 1 of the present invention. The manipulator 1 shown in FIG. 1 in the embodiment 1 is configured to have the display 50 and the switch compound 17 that are integrally arranged on the housing of the manipulator 1. However, the present invention is not limited to that configuration. The manipulator 101 in the alternative embodiment is configured to have a housing provided with the switch compound 17 and the control panel 15, separately from a display 150. In that alternative configuration, the control unit 10 of the manipulator 101 may be arranged at the side of the switch compound 17, and may be connected to the display 150, for example, with a connection cable. Thus, it is possible to arrange the display 150 on upper portion of an instrument panel in a case the manipulator 101 is mounted on a motor vehicle, and to arrange the switch compound 17, the control panel 15 and the like, at a place near a shift lever located between a driver seat and a passenger seat. In that arrangement, it may be configured to make the place arranging the switch compound 17, the control panel 15 and the like, portable within the motor vehicle. In a case that the display 150 is arranged separately from the switch compound 17, it may be provided with a remote manipulator including the switch compound 17, control panel 15 and the like, and sending contents of accepted operations, for example, with using infra-red radiation.

(Embodiment 2)

Figure 7A:
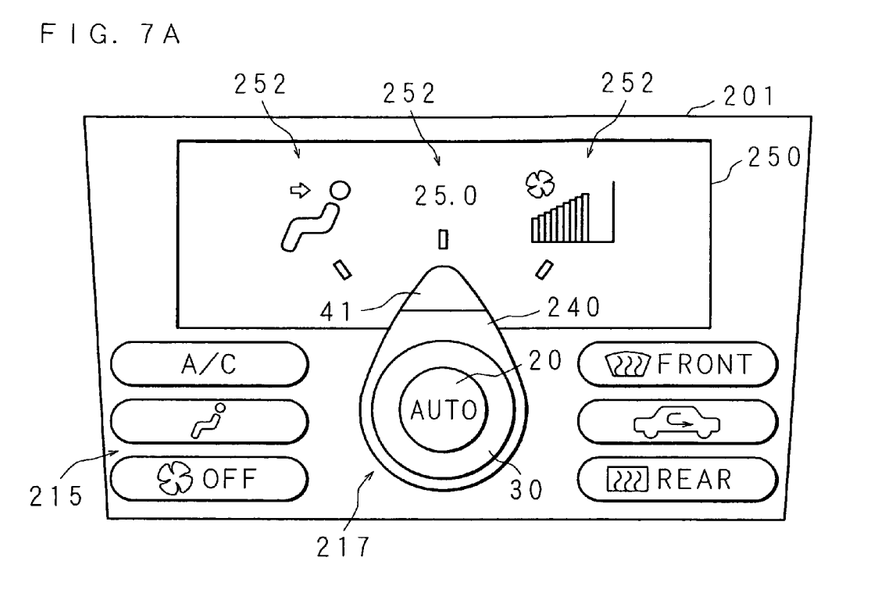
FIG. 7A and FIG. 7B are schematic views respectively showing an appearance of a manipulator according to an embodiment 2 of the present invention.
Figure 7B:
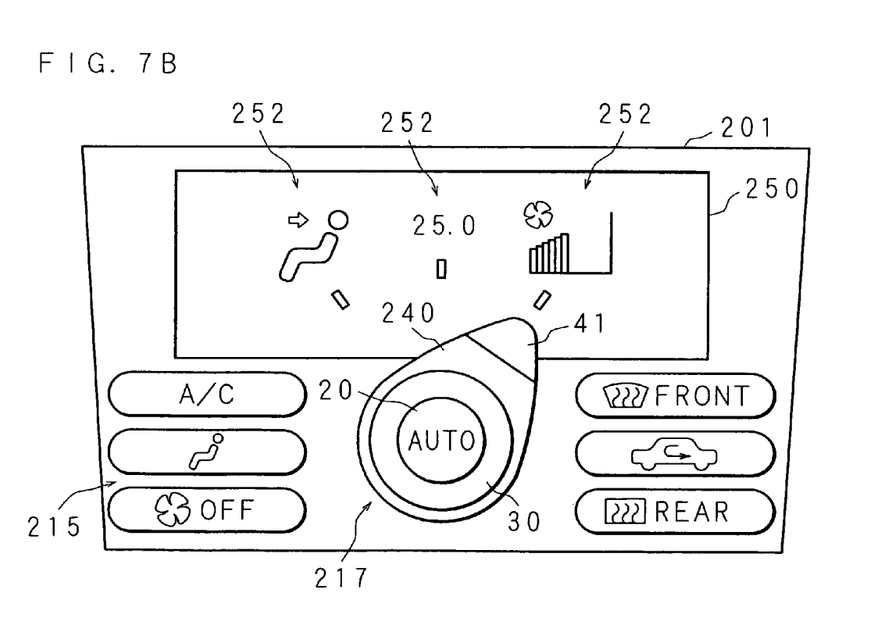

FIG. 7A and 7B are schematic views respectively showing an appearance of a manipulator 201 according to an embodiment 2 of the present invention. The manipulator 201 of the embodiment 2 includes a display 250, switch compound 217, control panel 215 having other switches and the like, and can accept settings of setup items 252 only for an air conditioner. The switch compound 217 of the manipulator 201 according to the embodiment 2 is configured similarly to the switch compound 17 of the manipulator 1 according to the embodiment 1, and is composed of a selection change switch 240, dial switch 30 and the push switch 20. However, the switch compound 217 according to the embodiment 2 has the selection change switch 240 failing to pivot, unlike the switch compound 17 according to the embodiment 1. In addition, the display 250 does not show a plurality of windows 51, unlike the display 50 according to the embodiment 1. The display 250 shows only three setup items 252 for the air conditioner.

The display 250 of the manipulator 201 is formed in an approximate rectangular shape wide in the horizontal dimension, and shows a setup item 252 at a left location for airflow direction of the air conditioner, a setup item 252 at a center location for temperature of the air conditioner, and a setup item 252 at a right location for airflow amount of the air conditioner. In the manipulator 201, the switch compound 217 has the selection change switch 240 whose tip portion 41 (indication portion) is arranged to cover a part of the display 50. Thus, the tip portion 41 can directly indicate the setup item 252 for airflow direction, setup item 252 for temperature or the setup item 252 for airflow amount, in accordance with a position, i.e., the left position, the center position or the right position, indicated by the rotating selection change switch 240.

For example, in a case of the manipulator 201 shown in FIG. 7A, the selection change switch 240 is positioned to select the setup item 252 for temperature of the air conditioner. Thus, a user can change the setting temperature higher and lower by rotating the dial switch 30 clockwise and anticlockwise. Furthermore, a user can select the setup item 252 for airflow amount by rotating the selection change switch 240 to right side (FIG. 7B), and then can change the setting airflow amount larger and smaller by rotating the dial switch 30 clockwise and anticlockwise.

In the manipulator 201 according to the embodiment 2 described above, the tip portion 41 can directly indicate a setup item 252 among the three setup items 252 shown on the display 250, because the selection change switch 240 is arranged to make the tip portion 41 cover a part of the display 250. Thus, a user can surely recognize which setup item 252 is selected by the selection change switch 240. Therefore, it is possible to enhance the operability of the manipulator 201 and to reduce user's wrong handling.

In the embodiment 2, the manipulator 201 is configured to accept setting operations for the air conditioner. However, the present invention is not limited to that configuration. The manipulator 201 may accept setting operations for other devices. In addition, as FIG. 7 illustrated examples about display contents of the display 250, switch arrangement of the control panel 215 and the like, the present invention is not limited to the illustration. Furthermore, the display 250 may highlight a setup item 252 selected by the selection change switch 240, in an enlarging method, changing color method, or a blinking method.

Other configurations of the manipulator 201 according to the embodiment 2 are similar to those of the manipulator 1 according to the embodiment 1. Thus, the configurations of the embodiment 2 that are substantially the same as those of the embodiment 1 are given the numerals identical to the embodiment 1 and, accordingly, will not be described in detail.

(Embodiment 3)

Figure 8A:
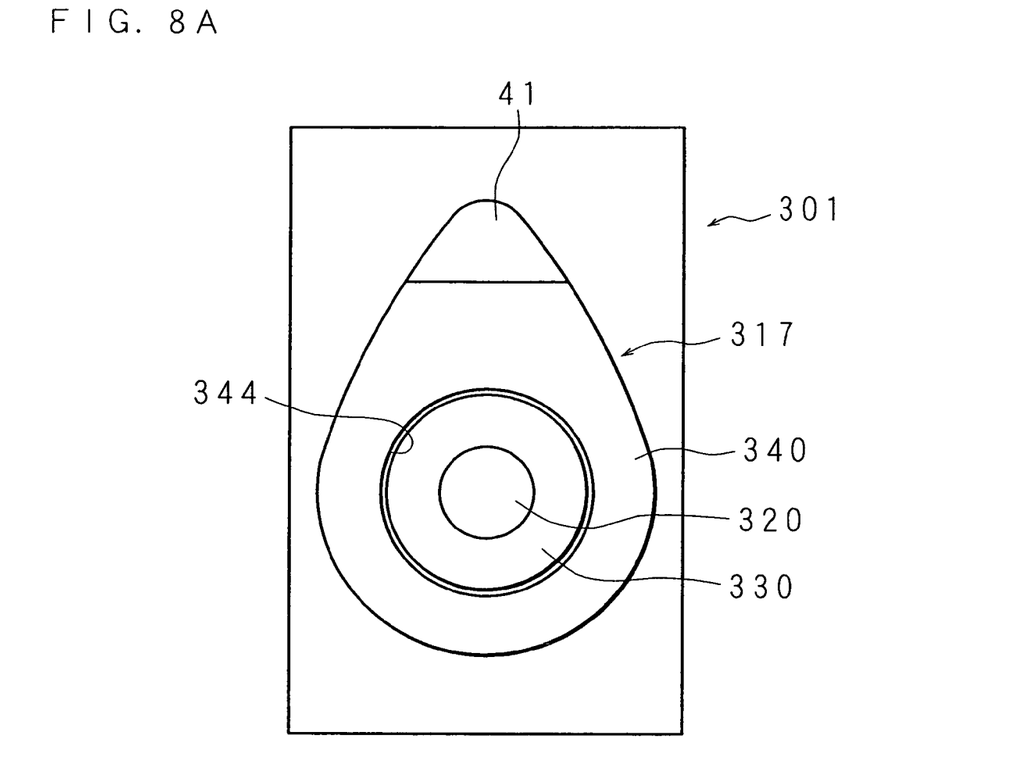
FIG. 8A and FIG. 8B are schematic views respectively showing a configuration of a switch compound according to an embodiment 3 of the present invention.
Figure 8B:
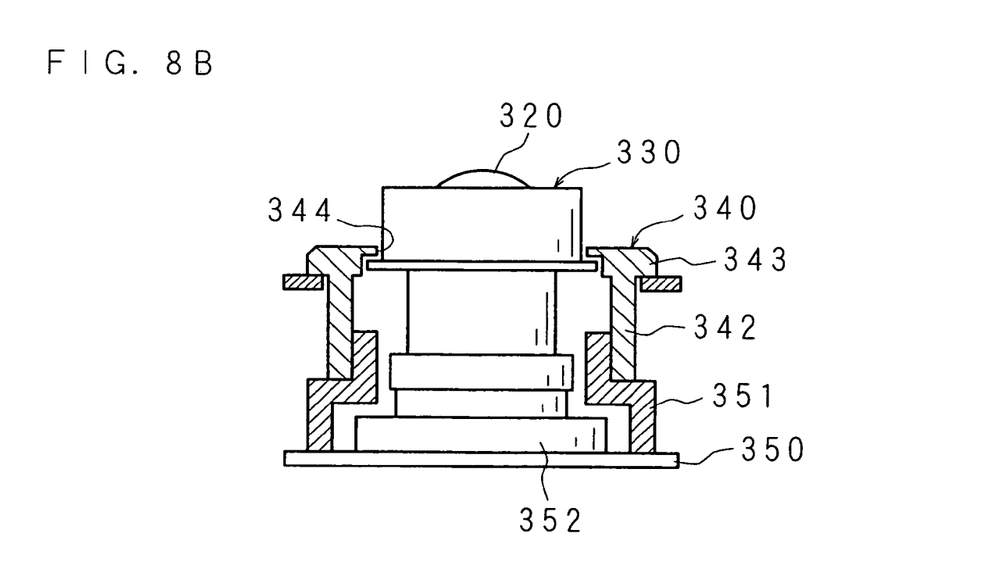

As described above, the switch compound 17 of the manipulator 1 according to the embodiment 1 is configured to have the selection change switch 40 formed in an approximate egg-like shape and the dial switch 30 formed in an approximate disk shape that were arranged in a stacked manner. However, the switch compound according to the present invention is not limited to that configuration. FIG. 8A and 8B is a schematic view showing a configuration of a switch compound 317 according to an embodiment 3 of the present invention. FIG. 8A illustrates a plan view of the switch compound 317 and FIG. 8B illustrates a cross section view of the switch compound 317.

The switch compound 317 according to the embodiment 3 has a selection change switch 340 formed in an approximate egg-like shape in a plan view, dial switch 330 formed in an approximate round shape in a plan view and a push-button switch 320 formed in an approximate round shape in a plan view. The selection change switch 340 includes a control portion 343 formed in an approximate egg-like plate shape. The control portion 343 is, for example, mounted on and exposed from an instrument panel of a motor vehicle. A user utilizes the control portion 343 to perform a rotation operation. The control portion 343 is formed to have a pointed tip portion 41 as an indication portion and have a through-hole 344 formed in an approximate round shape at a side opposite to the pointed tip portion 41.

The selection change switch 340 further includes a cylindrical rotary portion 342 that is formed in an approximate hollow cylindrical shape, is fixed to a surface of the control portion 343 and inserted through the through-hole 344 formed on the control portion 343. The cylindrical rotary portion 342 is inserted inside the instrument panel of the motor vehicle through the through-hole formed on the instrument panel, and is fitted over a cylindrical stationary portion 351 that is formed in a hollow cylindrical shape and is fixed to a circuit board 350 arranged inside the instrument panel. Thus, the cylindrical rotary portion 342 is held in a rotatable manner by the cylindrical stationary portion 351.

Therefore, when a user rotates the control portion 343 of the selection change switch 340, the control portion 343 and the cylindrical rotary portion 342 integrally rotate around the cylindrical stationary portion 351. The circuit board 350 is provided with, for example, electrical or mechanical switches to detect a rotation of the cylindrical rotary portion 342. Thus, the manipulator 1 can detect a rotating operation for the selection change switch 340 performed by a user.

The dial switch 330 is formed in an approximate solid cylindrical shape or an approximate hollow cylindrical shape. An external diameter of the dial switch 330 is configured to be smaller a little bit than an internal diameter of the through-hole 344 formed on the control portion 343 of the selection change switch 340. In addition, the circuit board 350 is provided with a rotary encoder 352 inside the cylindrical stationary portion 351 formed in a hollow cylindrical shape, to detect a rotation. The dial switch 330 is fixedly connected to the rotary encoder 352 provided on the circuit board 350. The dial switch 330 is configured to have one terminal protruding outside the instrument panel through the through-hole 344 of the selection change switch 340 fitted over the cylindrical stationary portion 351.

Therefore, the dial switch 330 can rotate within the selection change switch 340 formed in a hollow cylindrical shape, and the rotary encoder 352 can detect the rotation of the dial switch 330. In addition, the dial switch 330 is provided with a push-button switch 320 on one end surface to detect pushing operation performed by a user.

The switch compound 317 of the manipulator according to the embodiment 3 described above can accept operations similar to those accepted by the switch compound 17 of the manipulator according to the embodiment 1 having the selection change switch 40 and the dial switch 30 in a stacked arrangement. Therefore, it is possible to perform a selecting operation for a plurality of setup items shown on the display 50, setting operation for the selected setup item and the like, with utilizing the switch compound 317 together with the display 50. Furthermore, it is possible to downsize the switch compound 317, because the dial switch 330 is arranged within the selection change switch 340 in a rotatable manner.

The rest of the configuration of the manipulator 301 according to the embodiment 3 is similar to those of the manipulator 1 according to the embodiment 1. Thus, the configurations of the embodiment 3 that are substantially the same as those of the embodiment 1 are given the numerals identical to the embodiment 1 and, accordingly, will not be described in detail.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A manipulator that accepts setup operations for a plurality of setup items of plural devices and controls the plural devices based on the accepted setup operations, comprising:
   a compound switch that is formed with a plurality of switches;
   a display that shows setup items of a device; and a device selection accepting unit that accepts a selection of a device for a setup operation, wherein the compound switch comprises a first rotary switch and a second rotary switch;

the first rotary switch is allowed to rotate about a rotation axis to select a setup item of a device, and is allowed to pivot in a direction perpendicular to a direction of the rotation;

the device selection accepting unit accepts the selection of a device for a setup operation based on a pivot movement of the first rotary switch;

the display shows the setup items of the device for the selection accepted by device selection accepting unit; and the second rotary switch is arranged on the first rotary switch and is allowed to rotate to perform a detailed setting of the setup item selected by the first rotary switch, and the second rotary switch rotates about an axis that is substantially parallel to the rotation axis of the first rotary switch.

2. A manipulator according to claim 1, wherein the display highlights the setup item selected by the first rotary switch.

3. A manipulator according to claim 1, wherein the display shows the setup item selected by the first rotary switch, in an enlarging, color modifying and/or a blinking condition.

4. A manipulator according to claim 1, wherein the first rotary switch is formed in an egg-like plate shape, and selects a setup item indicated by a tip portion of the egg-like shaped plate, and the second rotary switch is formed in a disk shape.

5. A manipulator according to claim 1, wherein the display shows a plurality of windows overlaid with each other, each of which includes a plurality of setup items of a device, and moves to a foreground a window of a device represented by the selection accepted by the device selection accepting unit.

6. A manipulator according to claim 5, wherein the device selection accepting unit is arranged under the first rotary switch.

7. A manipulator according to claim 6, further comprising: another device selection accepting unit that is arranged under the first rotary switch and accepts the selection of a device for a setup operation based on a pivot movement of the first rotary switch.

8. A manipulator according to claim 7, wherein the display moves to a foreground or a background a window of a device represented by the selection accepted by the device selection accepting unit or said another device selection accepting unit.

9. A manipulator according to claim 1, wherein the first rotary switch and the second rotary switch are in a stacked arrangement.

10. A manipulator according to claim 1, wherein the first rotary switch is formed in a cylindrical shape, and the second rotary switch is arranged to rotate inside the first rotary switch.

11. A manipulator according to claim 1, wherein the compound switch further comprises a push switch that contributes in the setup operations and is arranged on the second rotary switch.

12. A manipulator according to claim 1, wherein the plural devices include an audio and an air conditioner.

13. A manipulator according to claim 1, wherein the manipulator is mounted on a motor vehicle.

14. A manipulator according to claim 1, wherein the tip portion is arranged on the display.

15. A manipulator that accepts setup operations for a plurality of setup items of plural devices and controls the plural devices based on the accepted setup operations, comprising:

a compound switch that is formed with a plurality of switches;

a display means for showing setup items of a device; and a device selection accepting means for accepting a selection of a device for a setup operation, wherein the compound switch comprises a first rotary switch and a second rotary switch;

the first rotary switch is allowed to rotate about a rotation axis to select a setup item of a device, and is allowed to pivot in a direction perpendicular to a direction of the rotation;

the selection of a device for a setup operation is accepted by the device selection accepting means on the basis of a pivot movement of the first rotary switch;

the setup items of the device for the selection accepted by device selection accepting means are shown by the display means; and the second rotary switch is arranged on the first rotary switch and is allowed to rotate to perform a detailed setting of the setup item selected by the first rotary switch, and the second rotary switch rotates about an axis that is substantially parallel to the rotation axis of the first rotary switch.

16. A manipulator according to claim 15, wherein a plurality of windows overlaid with each other, each of which includes a plurality of setup items of a device, are shown by the display, and a window of a device represented by the selection accepted by the device selection accepting means is moved to a foreground.

17. A manipulator according to claim 16, wherein the compound switch further comprises a push switch that contributes in the setup operations and is arranged on the second rotary switch.

18. A manipulator according to claim 17, wherein the plural devices include an audio and an air conditioner.

19. A manipulator according to claim 18, wherein the manipulator is mounted on a motor vehicle.

20. A manipulator according to claim 19, wherein the first rotary switch is formed in an egg-like plate shape, and selects a setup item indicated by a tip portion of the egg-like shaped plate, and the second rotary switch is formed in a disk shape.

* * * * *